United States Patent
Mears et al.

(10) Patent No.: US 6,598,890 B2
(45) Date of Patent: Jul. 29, 2003

(54) SEED METER TRANSFER AND STORING APPARATUS

(76) Inventors: Paul H. Mears, 998 S. Ave., Jefferson, IA (US) 50129; Randy L. Kester, 319 W. Chestnut, Ogden, IA (US) 50212

( * ) Notice: Subject to any disclaimer, the term of this patent is extended or adjusted under 35 U.S.C. 154(b) by 40 days.

(21) Appl. No.: 09/836,900

(22) Filed: Apr. 17, 2001

(65) Prior Publication Data

US 2002/0149302 A1 Oct. 17, 2002

(51) Int. Cl.⁷ .............................. B62B 3/10; A47K 1/04
(52) U.S. Cl. ............................... 280/79.3; 280/33.998; 280/47.35; 248/129
(58) Field of Search ............................ 280/47.34, 79.3, 280/79.11, 47.35, 33.99; 221/185, 211; 248/129, 224.8, 225.11; 111/200

(56) References Cited

U.S. PATENT DOCUMENTS

| | | | | |
|---|---|---|---|---|
| 2,947,565 A | * | 8/1960 | Wood | 108/55.1 |
| 2,966,991 A | * | 1/1961 | Duffner | 211/60.1 |
| 3,053,224 A | * | 9/1962 | Pierce | 119/400 |
| 4,093,251 A | * | 6/1978 | Boyer | 211/41.14 |
| 4,250,601 A | * | 2/1981 | Ward | 105/377.11 |
| 4,389,133 A | * | 6/1983 | Oberst | 220/532 |
| 4,457,527 A | | 7/1984 | Lowery | |
| 4,564,152 A | | 1/1986 | Herriage | |
| 4,579,358 A | | 4/1986 | Byfield | |
| 5,026,016 A | * | 6/1991 | Lisowski | 248/225.11 |
| 5,058,766 A | | 10/1991 | Deckler | |
| 5,188,308 A | | 2/1993 | Tussing | |
| 5,687,928 A | | 11/1997 | Lassiter | |
| 6,105,980 A | * | 8/2000 | Cino et al. | 206/505 |
| 6,206,385 B1 | * | 3/2001 | Kern et al. | 280/47.35 |
| 6,270,094 B1 | * | 8/2001 | Campbell | 242/594.4 |
| 6,422,504 B1 | * | 7/2002 | Elder | 211/85.5 |

* cited by examiner

Primary Examiner—Brian L. Johnson
Assistant Examiner—Brian L Swenson
(74) Attorney, Agent, or Firm—Sturm & Fix LLP

(57) ABSTRACT

A seed meter transfer and storage apparatus for storing seed meters of a type that are used, for example, on a corn or soybean planter. The apparatus includes a frame with a plurality of upwardly extending members operatively attached thereto. Each of the members are spaced a predetermined distance from each adjacent members and a slot is disposed at the top of each member for receiving a flange which is on each side of the seed meter. This allows one seed meter to be stored between each adjacent member for each pair of adjacent members.

11 Claims, 4 Drawing Sheets

SEED METER TRANSFER AND STORING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to a seed meter transfer and storage apparatus and more particularly to one which preserves the brushes which can otherwise be easily damaged.

2. Background Art

Planters such as those shown in U.S. Pat. No. 5,058,766 to Deckler are in common usage. The seed meter shown in the Deckler patent, which is incorporated herein by reference, very similar in shape and dimension to a seed meter also manufactured by Deere & Company. So the present invention in the preferred embodiment is directed primarily to a seed meter for these two manufacturers, although it is adaptable to other planter units.

A problem encountered by many farmers and other large corn and soybean producers is the storage and transfer of the seed meters such as the seed meter (22) shown in the Deckler patent. When the planter is used for one of soybean planting or corn planting and then it is decided to switch to planting the other crop, there is no good way to store the seed meters. So, for example, if a farmer is planting corn, then the unit (22) would be of a type designed primarily for corn and would be on the planter as shown in FIG. 1 of the Deckler patent. When the farmer wants to plant soybeans, a seed meter (22) of a different interior-type but having the same exterior shape would need to be substituted for each one of the corn seed meters (22). So when the corn seed meters are taken off of the planter, it is common for the farmer to merely pile them in the corner of a machine shed or perhaps put them in cardboard boxes or the like on a floor of a machine shed.

The Operations Manual for these planters explains that it is important to take good care of these seed meters because the brushes (65) are very fragile; and, if they become damaged, the seed meter will not work properly. At the time that the seed meters are stored on the floor or in a cardboard box they can easily be damaged by having the brushes become distorted from their normal shape. These brushes are also a target of rodents, such as mice and rats.

This problem is exacerbated from one season to the next when both the soybean seed meters and the corn seed meters are off of the planter and stored on the floor, for example, of a machine shed.

Accordingly it will be appreciate that there is a need for a better way to store and transfer seed meters.

BRIEF SUMMARY OF THE INVENTION

The present invention relates to a seed meter transfer and storage apparatus for storing seed meters of a type that are used, for example, on a corn or soybean planter. The apparatus includes a frame with a plurality of upwardly extending members operatively attached thereto. Each of the members are spaced a predetermined distance from each adjacent member and a slot is disposed at the top of each member for receiving a flange which is on each side of the seed meter. This allows one seed meter to be stored between each adjacent member, i.e., between a pair of adjacent members.

An object of the present invention is to provide a seed meter transfer and storage apparatus.

Another object of the present invention is to provide a seed meter transfer and storage apparatus for the purpose of preserving the brushes on seed meters.

A still further object of the present invention is to provide a seed meter transfer and storage apparatus which can be used during the season to help store and transfer a corn seed meter when it is desired to use soybean meters or the like, or vice versa. It is also useful for storing both corn seed meters and soybean seed meters between growing seasons.

Other objects, advantages, and novel features of the present invention will become apparent from the following detailed description of the invention when considered in conjunction with the accompanying drawings.

BRIEF DESCRIPTION OF THE DRAWINGS

FIG. 2 is a an enlarged partial side elevational view of one corner of the present invention, showing how the device can be on wheels or lifted from the wheels to be placed into a pickup truck bed or the like;

DETAILED DESCRIPTION OF THE INVENTION

Figure 1:
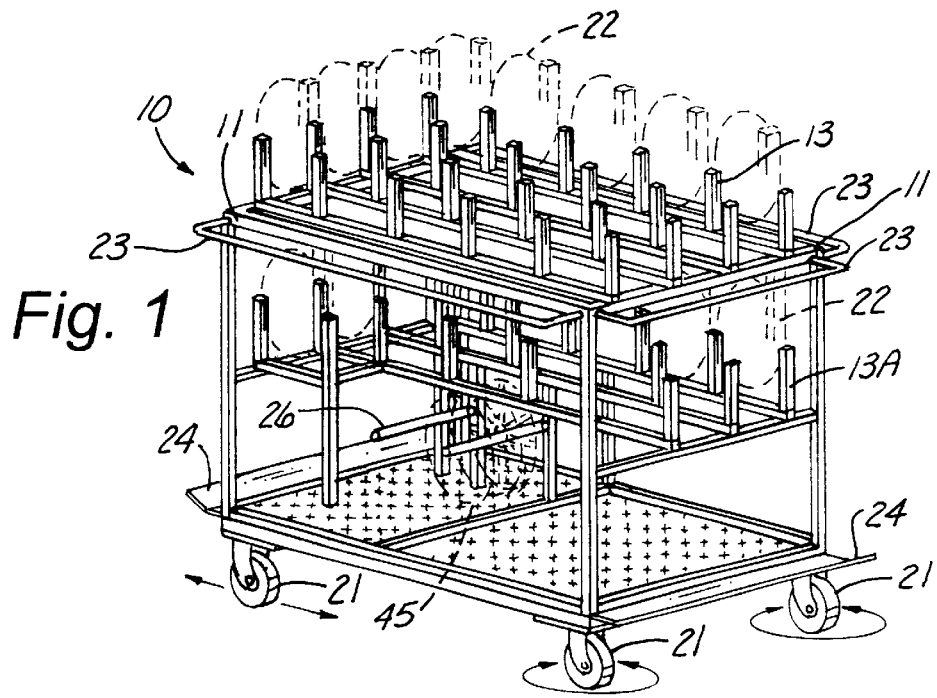
FIG. 1 is a perspective view of a preferred embodiment of the present invention showing seed meters in dashed lines on the upper part thereof in a storage position on the present invention and seed meter plates in dashed lines on the lower part thereof.

Referring now to the drawings, wherein like reference numerals designate identical or corresponding parts throughout the several views, FIG. 1 shows a seed meter transfer and storage apparatus (10) constructed in accordance with the present invention. The transfer and storage apparatus (10) includes a frame (11), which can be of many other shapes and configurations, but in the embodiment shown is essentially a rectilinear frame with a rectangular subframe on each of six sides thereof.

The top portion of the frame has a plurality of intermediate frame members (12), each having an upstanding member (13) thereon. Each of the upstanding members (13) has a slot (14) therein on each side thereof and each side also has a tapered depression (16), for reasons which will be explained below. The upstanding members (13a) on the ends have only a slot (14) and tapered portion (16) on one side thereof because they only receive a seed meter on one side thereof.

The bottom portion of the frame (11) is welded to vertical members (17), which are hollow tubes for receiving pins (18) on a cart (19) having caster wheels (21) attached thereto, the caster wheels (21) on one end being pivotally attached about a vertical axis and the caster wheels (21) on the other end being fixed, in-line, caster wheels (21).

Skid plates (22) are rigidly attached to each end of the lower part of the frame member (11) so that the frame above platform (19) and pins (18) can be lifted into a pickup truck or the like, if desired, for example to take soybean meters to the field where a planter has corn seed meters on it for exchange thereof. It is to be understood that this is strictly an optional part of the present invention. Handles (23) are rigidly attached to the frame (11) on each side thereof and on the front thereof for pulling the cart (10) from place to place.

Figure 2:
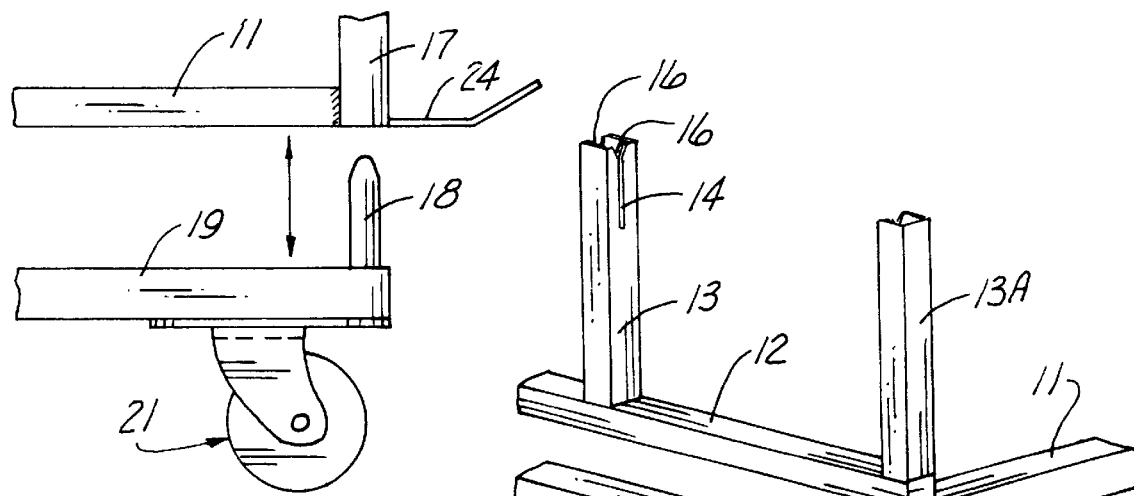
Figure 3:
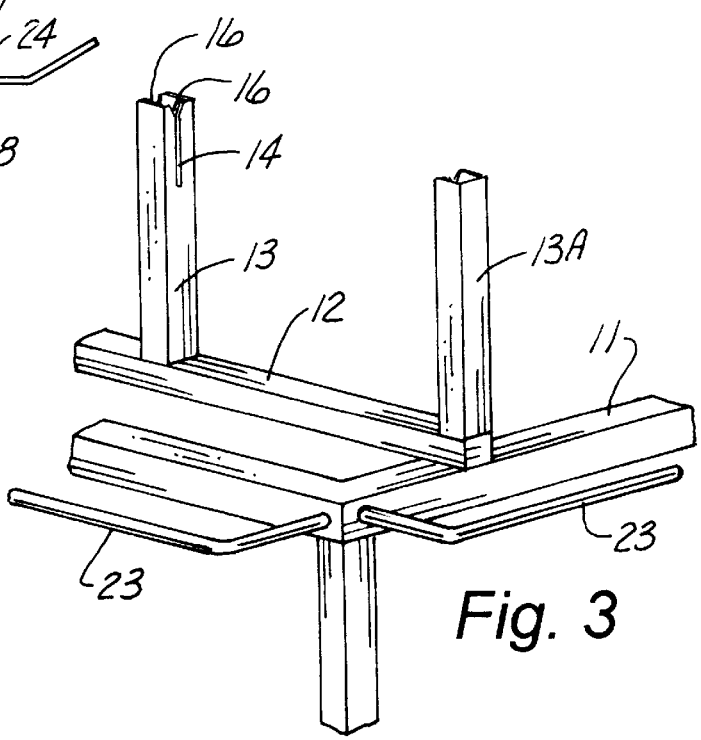
FIG. 3 is an enlarged partial perspective view of one corner of the present invention showing the frame, a handle for pulling it from place to place and a pair of upwardly extending members having slots and tapered depressions therein for receiving a seed meter in a storage position.
Figure 4:
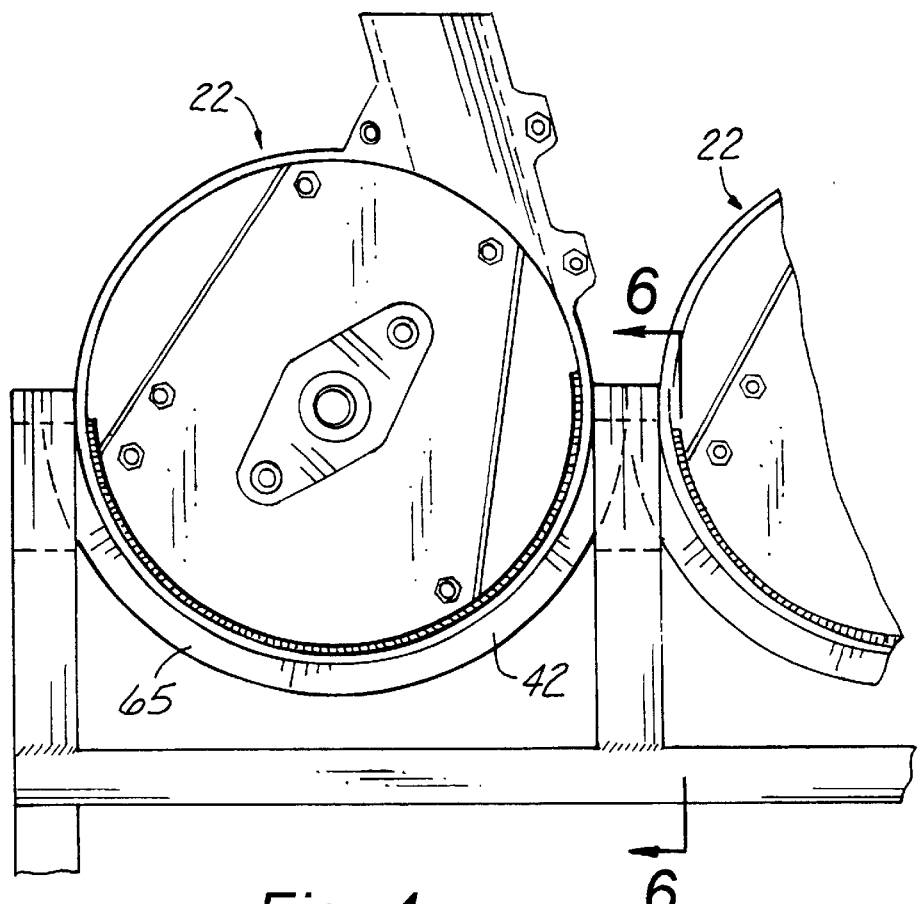
FIG. 4 is an enlarged partial front view of the present invention showing a pair of seed meters in storage position on the preferred embodiment of the present invention.
Figure 5:
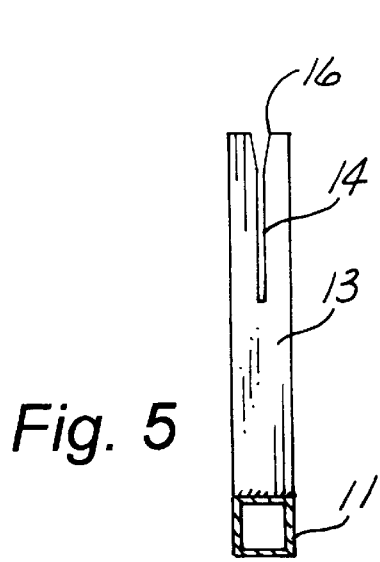
FIG. 5 is a cross sectional view taken along FIG. 6—6 of FIG. 4 except that without the seed meters in place.
Figure 6:
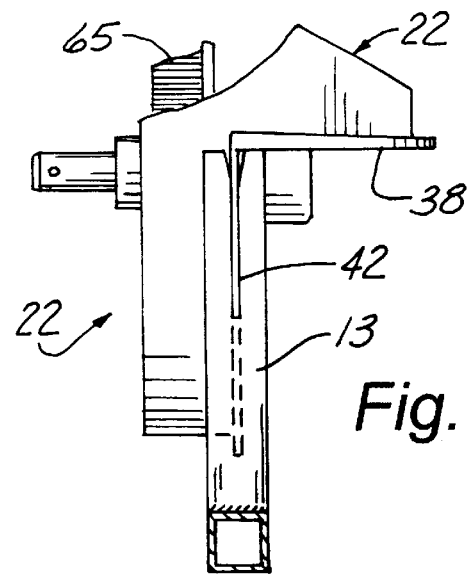
FIG. 6 is a cross sectional view taken along line 6—6 of FIG. 4.
Figure 7:
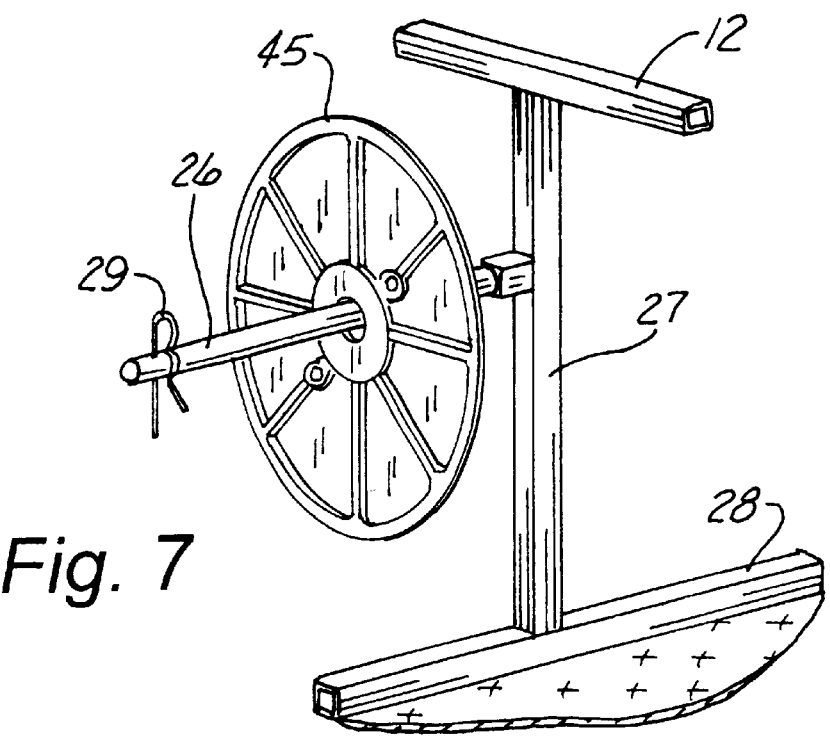
FIG. 7 is an enlarged partial perspective view of a lower portion of the device of FIG. 1 and showing how seed meter plates are placed in a storage position on a bar.
Figure 8:
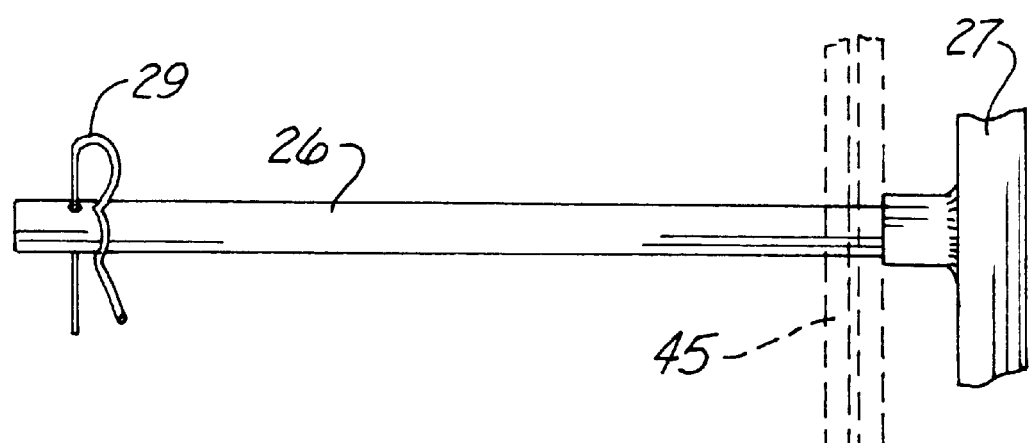
FIG. 8 is a side elevational view of the bar of FIG. 7 and showing the seed meter plates in dashed lines.
Figure 9:
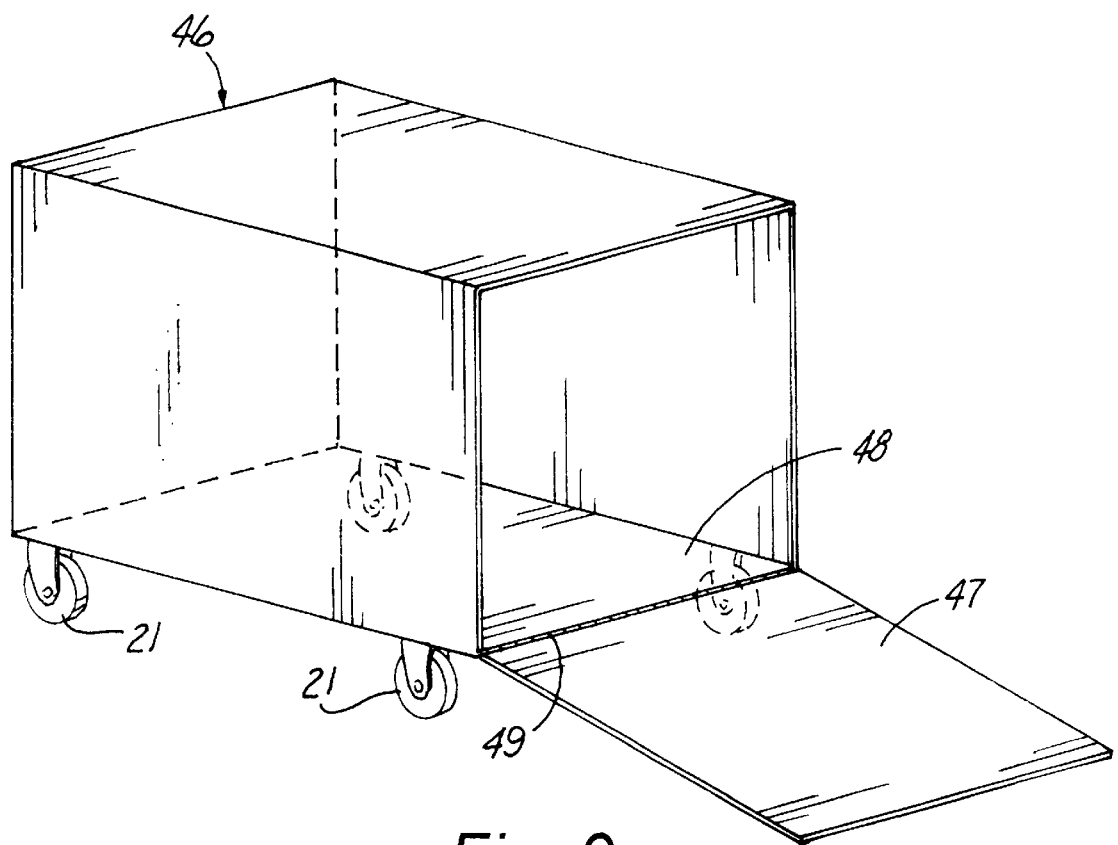
FIG. 9 is a perspective view of the present invention showing an enclosure for receiving the seed meter transfer and storage apparatus (10) of FIG. 1 to make it rodent-proof.

Referring now to FIG. 4, it is shown how the seed meters (22) have a flange (42) thereon and a stop flange (38) as best seen in FIG. 6. The seed meters (22) are actually turned upside down from that shown in FIG. 2 of the Deckler patent and are upside down from the position of which they are actually used on the planter, but it is the best position for storage of the seed meters because of the way the present invention is made. To store the seed meters, all that is done is that they are placed in the orientation shown in FIGS. 4 and 6 so that the flange (42) extends into the tapered depression (16) and slots (14) until the flange (38) engages the top of the upwardly extending members (13).

Looking back to FIG. 1, it can be seen that there are several rows of upwardly extending members (13) for receiving the seed meters (22), which are shown in dashed lines on the top part of FIG. 1. Also in FIG. 1, a plurality of rows of upwardly extending members (13) are provided on the lower portion of the frame (11) for receiving even more of the seed meters (22). It will be understood, of course, to those of ordinary skill in the art, that a user will merely make one of the carts (10) which has a sufficient number of places to store seed meters corresponding to the number of seed meters to be stored, i.e. thirty five, thirty one, etc.

The Operations Manual for the Kinze brand planter, shown in Deckler, recommends that the seed plates (45) be removed when the seed meters are stored to keep the brushes from being distorted. FIG. 1, in dashed lines shows these seed plates (45) being disposed on bars (26), which are rigidly attached to a horizontal post (27). The post (27) is then rigidly attached, for example by welding, to one or more of the cross members (12) and to a lower member (28), which is essentially just a brace on frame member (11). An opening in the end of bar (26) is provided for receiving a pin (29) to hold the seed meter plates (45) on the bar (26) so that they will not fall off of bar (26) when the seed meter transfer and storage apparatus (10) is rolled from place to place. A snap ring attaching structure on bar (26) could be used instead of the pin (20).

An enclosure (46) is essentially in the shape of a box that is large enough to receive the seed meter transfer and storage apparatus (10) of FIG. 1. A door (47) is pivotally attached to a floor (48) by hinges (49). That way, the door (47) acts as a ramp so that the wheels (21) of the storage device (10) can roll up onto the ramp/door (47) and into the enclosure (46). Then the door (47) is closed by pivoting it upwardly, and is latched by a latch which is not shown. The enclosure (46) can be made of any sort of rodent-proof material. The purpose of the enclosure (46) is primarily to keep rodents from destroying the brushes of the seed meters. Obviously a metal construction would keep the rodents out, but even a wooden enclosure which is elevated on caster wheels (21) would be sufficient for this purpose as long as it is monitored from time to time.

Accordingly it will be appreciated that the preferred embodiment disclosed herein does indeed accomplish the aforementioned objects. Obviously many modifications and variations of the present invention are possible in light of the above teachings. It is therefore to be understood that, within the scope of the appended claims, the invention may be practiced otherwise than as specifically described.

We claim:

1. A seed meter transfer and storage apparatus in combination with seed meters of a type that are used on a corn or soybean planter and having a generally L-shaped flange disposed on each side thereof, said apparatus comprising:
   a frame;
   a plurality of upwardly extending members operatively attached to said frame, each of said members being spaced a pre-determined distance from each adjacent member; and,
   a slot disposed in the top of each member for receiving the flange on each side of a seed meter whereby one seed meter can be stored between each adjacent member.

2. The apparatus of claim 1 wherein more than one of said members have a tapered depression on the top thereof which is wider at the top than at the bottom thereof and has the top of one of the slots terminating into said depression, whereby said tapered depression facilitates easy insertion of the seed meter flange into said slot.

3. The apparatus of claim 1 including a plurality of rows of upwardly extending members on said frame for storing a plurality of seed meters.

4. The apparatus of claim 1 for also storing a seed disc having a central opening therein, which seed disc is disposed in said seed meter during use when on a planter, said apparatus comprising at least one substantially horizontal bar operatively attached to said frame for receiving a plurality of said seed discs.

5. The apparatus of claim 4 including a pin and wherein said bar is welded to said frame and said bar has an opening in one end thereof for selectively receiving said pin, whereby said seed discs are prevented from falling off of said bar when said pin is inserted into said opening.

6. The apparatus of claim 1 including a plurality of wheels operatively disposed on the bottom of said frame for permitting said apparatus to be moved around on said wheels and to provide a space for a fork lift to pick it up if desired.

7. The apparatus of claim 1 including an enclosure into which said frame can be selectively disposed whereby the seed meter is protected from damage by rodents.

8. The apparatus of claim 7 including a plurality of wheels operatively disposed on the bottom of said frame for permitting said apparatus to be moved around on said wheels.

9. The apparatus of claim 8 wherein said enclosure has a door on one side thereof whereby said frame can be rolled into said enclosure.

10. The apparatus of claim 9 wherein said enclosure has a floor and said door is pivotally attached to the floor of the enclosure so that the door can pivot downwardly to an open position and be used as a ramp to facilitate the rolling of said frame into said enclosure.

11. The apparatus of claim 10 wherein wheels are attached to permit said enclosure to be easily moved from place to place and to permit a space for a fork lift to pick it up if desired.

* * * * *